United States Patent
Martin

(10) Patent No.: US 8,452,622 B1
(45) Date of Patent: *May 28, 2013

(54) METHODS FOR ADMINISTERING CLAIMS IN A PENSION BENEFIT INSURANCE PROGRAM

(75) Inventor: John A. Martin, Johnsonburg, NJ (US)

(73) Assignee: Pentech, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,136

(22) Filed: May 21, 2012

Related U.S. Application Data

(63) Continuation of application No. 12/748,672, filed on Mar. 29, 2010, now Pat. No. 8,204,769, which is a continuation of application No. 10/414,365, filed on Apr. 15, 2003, now Pat. No. 7,716,073.

(51) Int. Cl.
| | |
|---|---|
| G06Q 10/00 | (2006.01) |
| G06Q 50/00 | (2006.01) |
| G06Q 40/00 | (2006.01) |
| A61B 5/00 | (2006.01) |
| G06F 19/00 | (2006.01) |

(52) U.S. Cl.
USPC ........................................ 705/4; 705/2; 705/3

(58) Field of Classification Search
USPC .......................................................... 705/2–4
See application file for complete search history.

(56) References Cited

U.S. PATENT DOCUMENTS

| | | | |
|---|---|---|---|
| 4,953,085 A | 8/1990 | Atkins | |
| 5,206,803 A | 4/1993 | Vitagliano | |
| 5,673,402 A * | 9/1997 | Ryan et al. | 705/38 |
| 5,878,405 A * | 3/1999 | Grant et al. | 705/39 |
| 5,903,879 A | 5/1999 | Mitchell | |
| 5,933,815 A | 8/1999 | Golden | |
| 5,966,693 A * | 10/1999 | Burgess | 705/4 |
| 6,161,096 A | 12/2000 | Bell | |
| 6,163,770 A | 12/2000 | Gamble et al. | |
| 6,473,737 B2 | 10/2002 | Burke | |
| 7,398,245 B1 * | 7/2008 | Bent et al. | 705/38 |
| 7,716,073 B1 | 5/2010 | Martin | |
| 7,752,062 B1 | 7/2010 | Martin | |
| 7,848,939 B1 | 12/2010 | Martin | |
| 7,912,738 B1 | 3/2011 | Martin | |
| 2001/0044773 A1 * | 11/2001 | Sellers et al. | 705/38 |
| 2002/0120477 A1 | 8/2002 | Jinnett | |
| 2003/0105700 A1 | 6/2003 | Browne et al. | |

OTHER PUBLICATIONS

Chin, Audry, et al., "Social Security Financing—Informing Decisions of Uncertain Futures", The Rand Graduate Institute, 1988, vol. 4909A of Dissertations Abstracts International. p. 2801, 297 Pages.*
Chin et al., Social Security Financing—Informing Decisions of Uncertain Futures, The Rand Graduate Institute, 1988, vol. 4909A of Dissertations Abstracts International, p. 2801, 297 pages.

* cited by examiner

*Primary Examiner* — Jason Dunham
*Assistant Examiner* — Amber Altschul
(74) *Attorney, Agent, or Firm* — Eric L. Sophir; Dentons US LLP

(57) ABSTRACT

A pension insurance plan method involves administering claims made against a pension debt coverage policy provided in the plan. The policy protects an outstanding balance of a defined contribution plan loan secured by participant's plan assets, eliminating adverse tax consequences to the plan beneficiary in the event of the death or disability of the participant and ensuring that the full plan account balance passes intact to beneficiary in such event.

55 Claims, 10 Drawing Sheets

METHODS FOR ADMINISTERING CLAIMS IN A PENSION BENEFIT INSURANCE PROGRAM

CROSS-REFERENCE TO RELATED APPLICATIONS

This application claims priority to and is a continuation of co-pending U.S. patent application Ser. No. 12/748,672, entitled "METHODS FOR ADMINISTERING CLAIMS IN A PENSION INSURANCE PROGRAM," filed on Mar. 29, 2010 now U.S. Pat. No. 8,204,769, which claims priority to and is a continuation of U.S. patent Ser. No. 10/414,365, entitled "METHODS FOR ADMINISTERING CLAIMS IN A PENSION INSURANCE PROGRAM," filed on Apr. 15, 2003 now U.S. Pat. No. 7,716,073, which are incorporated by reference in its entirety.

FIELD OF INVENTION

This invention is related to the field of retirement accounts in general, and to insurance for preservation of defined contribution pensions in particular.

BACKGROUND OF INVENTION

Most employers offer their employees a retirement plan under Section 401(k) of the Internal Revenue Code, often called a "salary-reduction" plan. In addition, some businesses offer profit sharing money purchase plan. Not-for profit organizations offer an analogous retirement plan under Section 403(b) of the Internal Revenue Code. Many of these plans allow plan participants to borrow against the money they have built up in their account. The loan feature is a popular employee benefit providing a convenient source of credit to plan participants, particularly to lower wage earners.

Typically, the employer sets up the plan with an investment company, an insurance company, or a bank trust department. The employee, as a plan participant, in turn, agrees to put part of his/her salary into a special savings and investment account. Most 401(k) plans offer a variety of investment vehicles, from individual stocks or mutual funds to money market accounts. The money the plan participant invests is not counted as income for the participant's annual tax return. Earnings that accumulate in the account are not taxed until the participant starts making withdrawals, usually after reaching the age of 59½ under present provisions. If the withdrawal occurs earlier, the participant must pay tax on the money withdrawn and, under present U.S. income tax provisions, a stiff 10 percent federal excise tax penalty.

Many companies that offer 401(k) or 403(b) plans also match plan participant contributions up to a threshold level defined for the plan. This feature has encouraged employees, especially those that are less well compensated, to participate in these plans.

Internal Revenue Service (IRS) rules allow plan participants to borrow up to 50% of the value of their 401(k), or 403(b) retirement accounts, $50,000, whichever is less. The participant pays interest on the loan to his/her own account, thereby creating a creditor-debtor relationship with himself/ herself and their plan account. The loan becomes a fixed-income asset much like a bond, creating income on a par with many bond funds. Loan payments must be made at least once every quarter, but are most often deducted from each payroll period. The entire amount must be repaid within five years, unless the money is used to purchase a principal residence.

Owners of individual retirement accounts ("IRA"s) are generally not presently permitted under existing regulations to take loans against their accounts. However, such regulations may be subject to change over time in response to increasing demands.

As convenient and popular as retirement plans loan may be, they can nevertheless lead to unexpected tax liability that can be devastating to the plan beneficiaries. Because loans that have not been repaid are subject to treatment as a distribution from the plan in the event of the death or disability of the plan participant, they subject the plan participant's estate to tax liability of up to 40% or more of any such distribution. Loans repaid within sixty days, under present rules, avoid such treatment. Yet for beneficiaries of plan participants who are unaware of existing time limits, or are unable to render timely payment, the plan account assets to which they are entitled suffer from the adverse effects of the unfavorable tax treatment, thereby, unnecessarily reducing the value of assets in the account.

Similarly, in the event of the disability of the plan participant, plan loans are repayable within sixty days of the date of disability. If the plan participant or beneficiary is not able to repay the plan loan, remaining plan assets used to satisfy the plan loan are subject to treatment as a distribution from the plan, representing a tax liability of the plan participant of up to 40% or more of any such distribution.

Distributions from 401(k) plans, including those that occur upon the death or disability of a plan participant who has taken a loan, are potentially subject to two federal taxes and state income taxes, depending upon state of residence, namely: a) federal excise tax (10%) on total distribution if the recipient is under age 59½; b) federal income tax on the total amount of any distribution, which is treated as ordinary income; and c) state income tax, if applicable, on the total amount of any distribution, which is treated as ordinary income.

Uninsured death or disability of a participant loan recipient will result in as much as 30% to 40% of the imputed distribution—i.e., the unpaid loan balance—being paid out to satisfy the resultant tax obligation. Volatility in the financial markets at the time of death or disability may leave the plan account with plan asset value inadequate to satisfy even the loan obligation, much less the tax obligation on the imputed distribution of the unpaid loan balance, thereby depleting or even exhausting plan account assets.

Banks and other financial institutions for years have demanded Insurance security," even for "secured" consumer loans before the transactions close. For example, consumer loans secured by a motor vehicle also require auto insurance with the bank being named as loss payee. Similarly, consumer loans secured by a home also require homeowner's insurance with the bank being named as loss payee. Also, commercial loans to small businesses often require "key person" coverage, with the bank receiving a collateral assignment of the policy. So-called "credit life" insurance has also been offered to cover certain consumer indebtedness, though this practice, where it has occurred, generally has been discredited as a form of virtual usury and has consequently been avoided.

A provision of regulation Z (Section 226.4) of the consumer credit regulation related to loan disclosures makes it possible for plan sponsors/trustee/administrator, that already manage their 401(k) loans under consumer lending provisions as do banks, to more completely fulfill their fiduciary role. Under the provisions of regulation Z, plan sponsors accepting the pension insurance program, would require plan participants to provide insurance coverage as a condition of credit. They could allow their plan participants to choose coverage under a group (credit) life or a group (credit) life & disability policy issued to the plan trust as policyholder on behalf of plan participants and their plan accounts, or plan participants could opt-out of the group insurance policy and arrange for coverage anywhere they choose, posting it as a collateral assignment to the plan. Current practices, however, leave the option to the consumer as to whether they elect to have insurance coverage. Current practices also place the burden on a plan participant and beneficiary (usually low wage earners), positioning them as adversaries of the plan. The impact of "current practices" is that the deficiency to a pension plan unnecessarily dissipates plan assets, a conceptual violation of the plan sponsor's and plan trustee's role as fiduciary. What is needed is a pension insurance plan that fulfills the so-called "prudent man" test imposed by ERISA (Employee Retirement Income Security Act of 1974, as amended), a requirement not currently adequately being fulfilled currently by plan sponsors and pension fiduciaries.

SUMMARY OF THE INVENTION

In contrast, various aspects of the present invention encourage a sponsor or manager of a defined contribution pension plan (e.g., without limitation, a 401(k), 403(b), IRA or other eligible plan) to better fulfill its fiduciary role by utilizing the provision of Regulation Z, requiring insurance with the necessary loan disclosures. Consumer credit regulation Z, Section 226.4, allows mandatory charges, such as insurance coverage. If coverage is required as a condition of credit and the resulting premium is acknowledged by the borrower, a calculated premium is reflected as a part of the annual percentage rate (paid to their own account). Consumers are allowed to opt-out of plan loan insurance arranged by the plan, if they provide other insurance coverage for the loan. Furthermore, ERISA permits individual service fees, (such as premium) which may be charged to the accounts of individuals choosing to take advantage of a particular plan feature.

According to the present invention, no pension loan debt outlives it maker. If a defined contribution pension plan participant-borrower suffers a risk event, such as unemployment, disability or death, the full account balance of the retirement account, as if the loan had been repaid by the participant-borrower, passes to the designated plan beneficiary in the case of death. Unnecessary depletion of the pension account by federal and state taxes is avoided. The employer plan sponsor is removed from an adversarial position with plan beneficiaries who may contest the validity of the loan or the value of the account at a future date.

The present invention is directed to methods for administering claims made against a debt coverage policy in a pension insurance plan in the event of occurrence of a risk event, such as unemployment, disability or death of a plan participant. The pension insurance plan protects loan participants, in a 401(k), 403(b), IRA or other eligible retirement account, through a debt coverage policy to be purchased or assigned to the plan in the amount of the outstanding loan. The debt coverage policy comprises a group insurance policy, or a state regulated group credit insurance policy. The credit insurance policy can be a group credit life only insurance policy, or a group credit life and/or disability policy.

A program insurance administrator has the responsibility of determining the validity of claims. The insurance administrator, upon receipt of claims form and documentation, completes the claims adjudication process necessary to determine that the claim is valid, and that the payment amount due to the plan trustee on behalf of the participant's plan account is correct. Upon completion of the adjudication process, the trustee sends an electronic report to the plan administrator with claims for a designated period, including account numbers and amounts due each account. Subsequently, the trustee forwards any claim that does not meet the terms of the policy that would otherwise be rejected, to the insurance underwriter for review prior to submission to the plan administrator.

An embodiment of the invention involves a method for administering claims made against a pension debt coverage policy of a pension insurance plan program. An insurer underwrites the policy. The policy covers a balance of a loan made to a plan participant having assets in a retirement account held by the borrower-participant. The loan is collateralized by assets in the retirement account held by the borrower, who is a participant in a defined contribution pension plan. The method involves receiving notification of occurrence of a risk event, triggering payment of a benefit under the policy. Upon receipt of the notification, a claim is presented to the insurer, resulting in payment of a value in response to the claim.

Another embodiment of the present invention provides a method for administering the adjudication of a claim against a defined contribution pension insurance plan. The claim is made by a plan participant having a plan account covered by the pension insurance plan. The defined contribution pension insurance plan involves a pension debt coverage policy. Upon receipt of evidence of a claim against the defined contribution pension insurance plan, a determination is made whether the claim is valid, and upon the determination of validity, a benefit to the participant's plan account is paid.

Still another embodiment of the present invention involves a method for administering cancellation of indebtedness associated with a loan made to a participant in a defined contribution pension plan. The participant holds a retirement account associated with the plan, assets of which account are collateral for the loan. The method includes the steps of receiving notification of occurrence of a risk event and waiving a right to collect the outstanding loan balance in consideration of previously received payments in an amount equivalent to a premium for credit insurance associated with a similar risk event and loan balance. In yet another aspect, payment is received in an amount sufficient to substantially offset the loan balance, the right to whose collection has been waived.

The methods of the present invention can be used in conjunction with the invention described in applicant's related co-pending patent applications, entitled, "Pension Insurance Program Methods and Systems," application Ser. No. 10/414,364; "Methods for Administering Loan Premiums in Pension Insurance Program", application Ser. No. 10/414,336; and "Method for Validating Participants in Pension Insurance Program", application Ser. No. 10/414,355, all filed on Apr. 15, 2003.

DETAILED DESCRIPTION

According to the present invention, a pension insurance "program" for preserving defined contribution retirement account assets comprises a defined contribution pension insurance plan program requiring plan sponsors or managers to make insurance a prerequisite and a condition of credit on plan loans to remedy plan deficiencies in retirement plans. Moreover, a defined contribution pension plan, as that term is used in the context of the present invention, includes 401(k), 403(b), IRA and all other retirement account plans that are, or become, eligible for making loans collateralized by account assets.

Figure 1A:
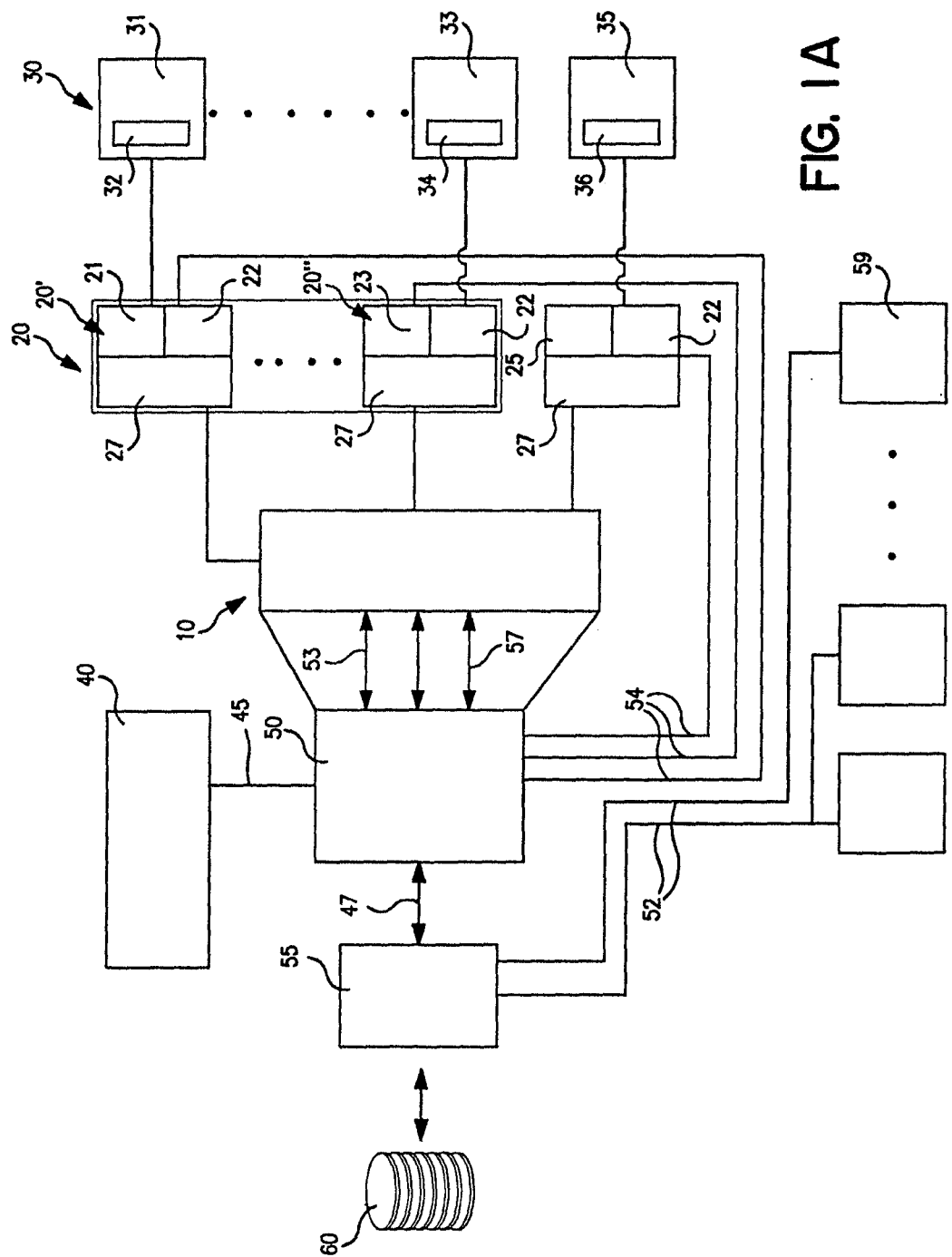
FIG. 1A is a schematic representation of one aspect of an embodiment of the present invention showing the relationship of a pension plan service provider with respect to entities that sponsor and administer the plan.

In an embodiment of the present invention, a pension insurance services provider 10 shown in FIG. 1A develops and produces a pension insurance plan program managed by a pension program manager. The program is designed to protect a retirement account from adverse tax consequences in the event of a risk event during the repayment of a loan taken against the account, such as the death or disability of the account holder. The program ensures that the full plan account balance passes intact to beneficiary in such an event.

Programs 20 provide for accounts 20' and 20", including retirement accounts 27, which are used as collateral for loans 22. Employee retirement accounts can be a 401(k) plan 21, and/or money purchase plan 23 for corporations 31, 33, respectively, or a 403(b) plan account 25 for non-profit organizations, such as 35 in FIG. 1A. The 403(b) plan account 25 could be administered by the same entity that administers 401(k) plans 20', . . . , 20", but for purposes of illustration, in this embodiment, is shown as provided by a separate entity. Similarly, for an IRA, the account 25 would be administered not by an employer, but by a financial services company (such as a bank, an insurance company, a securities firm, etc.); however, the functions performed in this capacity would be largely the same.

In exchange for consideration, employer 30 elects to offer protection to plan assets of its employees, who are plan participants, and their beneficiaries. To do so, it sponsors the pension insurance plan program and sponsors the program, which may involve obtaining necessary permissions and licenses. The sponsor employer 30 can delegate the operation of the pension insurance program to a plan trust and plan trustee 32, 34, 36 of the respective entities 31, 33 and 35. An internal corporate unit can assume the plan trustee duties. In accordance with an aspect of the present invention, the pension insurance plan program provides the plan-sponsoring employer 30 added security in carrying out fiduciary responsibilities towards its employee plan participants and their beneficiaries by offering the participants who borrow against the retirement plan assets the choice of receiving a group debt coverage policy or separately arranging coverage from any other qualified insurer to secure his or her plan loan. The debt coverage policy may comprise, without limitation, a group insurance policy, or a group credit insurance policy or even debt cancellation coverage. A credit insurance policy can be a group credit life only insurance policy, or a group credit life and/or disability policy. A fee structure for the group debt coverage policy, as well as the monitoring of assigned policies to the plan administrator (further described below), are the result of the program developed, maintained, overseen and controlled by pension insurance services provider 10, which serves as the over-all program manager. The over-all program manager for the pension insurance plan program, who may be provided by a pension insurance services provider, also sets a fee structure for the group debt coverage policy, and monitors assigned plan policies.

Debt cancellation, though not regulated as insurance, nevertheless falls within the scope of "debt coverage" as that term is used in the context of the present invention. Debt cancellation involves a plan's waiver of its right to collect the outstanding loan balance upon occurrence of a risk event, in consideration of receipt of payments in an amount equivalent to an insurance premium. The plan arranges a contractual liability policy issued to the creditor that has made the loans, i.e., the plan trust, guaranteeing repayment of the cancelled amount.

In one aspect of an embodiment of the present invention, an employer, as a plan sponsor 40, can delegate the administration of the program to an outside independent plan administrator 50 in contrast with employer plan sponsors 30 that administer the program internal to their organizations. The roles of plan sponsor 40 and plan administrator 50 as fiduciary and co-fiduciary, respectively, benefit the plan participants and their beneficiaries in the requirement for debt coverage insurance as a condition of credit offering. Pension insurance services provider 10 contracts and communicates via channels 53, including the internet 57, with plan administrator 50, to assess and supervise the needs of the plan sponsor 40 in a manner necessary to support and control the program and in accordance with the description provided below.

Insurance administrator 55 supervises and assesses the needs of plan administrator 50, plan sponsors 40, 30 and trustees 32, 34, 36 in support and control of the pension insurance plan program. The insurance administrator 55 establishes suitable systems and procedures to accommodate the reporting needs of the insurer, while gathering appropriate data from the plan administrator 50. Insurance administrator 55 also establishes procedures to accommodate reporting to and from plan sponsors 30, 40 and plan administrators 50. It allows plan sponsors to select a type of debt coverage policy comprising either life only, or life and/or disability only insurance. Plan sponsor transmits the selection of coverage type to the plan trustee and plan administrator. According to an aspect of the present invention, the plan sponsor 30 may require debt coverage as a condition to extending a loan secured by a plan participant's account assets. The plan administrator offers plan participants applying for a loan the option to accept a group debt coverage policy or to "opt-out" and separately arrange, on their own, insurance coverage for a loan taken under the plan. Plan administrator 50 collects pertinent insurance data on opt-out carriers 59 and provides that data to insurance administrator 55, which communicates with "opt-out" carriers 59 via channels 52, which can be any suitable means for such communication. Communications between insurance administrator 55, plan administrator 50 and pension insurance services provider 10 program manager take place via channels 47, 53, 54, including internet 57 as shown in FIG. 1A or any other suitable communication means. Information related to pension account activities, tracking of participants that have opted out and elected to make separate insurance arrangements, and communications between entities or components involved in providing the pension loan program and debt coverage insurance of the pension plan program are recorded on a computer-readable medium 60.

Figure 1B:
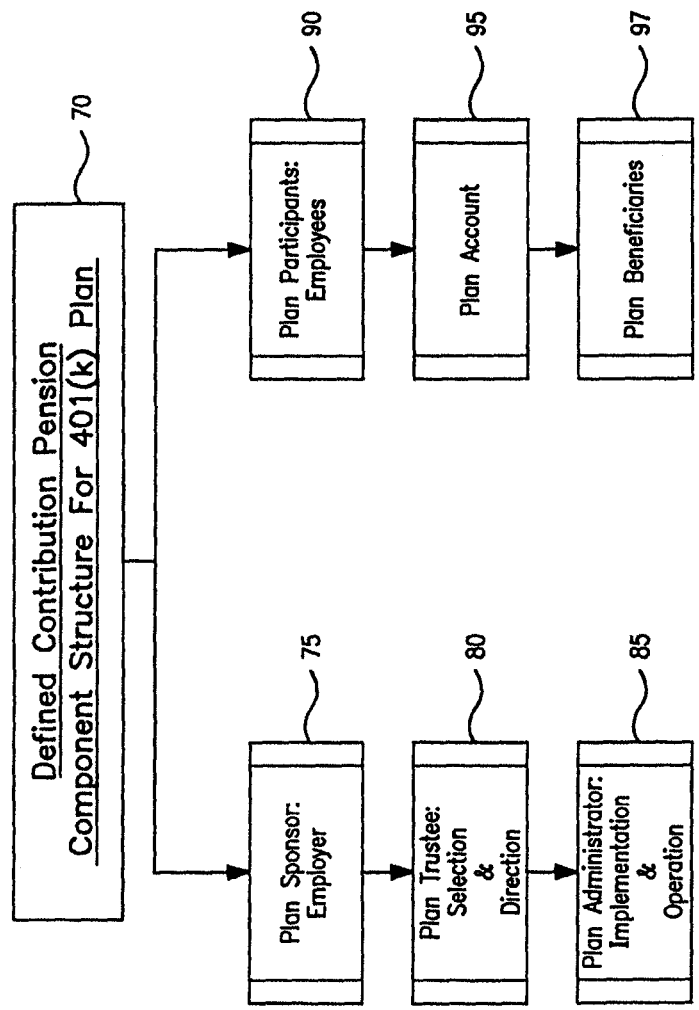
FIG. 1B is a diagram showing the component structure of a defined contribution pension plan for a 401(k) plan.

FIG. 1B shows component structure 70 as applied to a defined contribution pension, e.g., 401(k) plan. Plan sponsor 75 is the employer, responsible for formulating a defined contribution plan for its employees and filing a pension plan document with the Department of Labor. The pension plan sponsor 75, which may be the same as employer 30 in FIG. 1A, delegates the operation of the plan to a plan trust and a plan trustee 80. The plan trustee duties can be assumed by an internal corporate unit, or they can be outsourced to an independent plan administrator 85, as stated above. Plan participants 90 are typically the employees of the plan sponsor 75. Employee participants establish a plan account 95 by electing to participate in the plan. The participants fall into two broad categories: highly compensated employees (HCE) and non-highly compensated employees (NHCE). Participant and employer contributions, and any earnings or losses from their chosen investments, create the assets in the participant's plan account 95. Ownership of plan account assets resides with the participant for their own contributions and with the participant on plan sponsor contributions over a vesting schedule outlined in the plan document. The plan participant must establish a plan account beneficiary 97, to whom ownership of the account assets pass upon the death of the plan participant. Plan participants 90 are offered the choice of either accepting coverage under a pension insurance plan debt coverage policy issued to the plan trustee 80, or providing their own insurance coverage, equal to the initial amount of the loan, and collaterally assigning it to the plan trust.

The debt coverage policy may be any insurance policy or a credit insurance policy. Each insurance policy may be written as a group or individual policy. Insurance policies can provide coverage for life, disability, unemployment and for other risk events, and for any combinations thereof. Thus, credit insurance policy can be a group credit life only insurance policy, or a group credit life and/or disability policy. The debt coverage policy may provide guaranteed-issue coverage, evidenced by a certificate of insurance (regardless of age or health), with premium and benefits tailored to the outstanding loan balance with insurance cost disclosed in the loan disclosure and reflected in the annual percentage rate.

Figure 2:
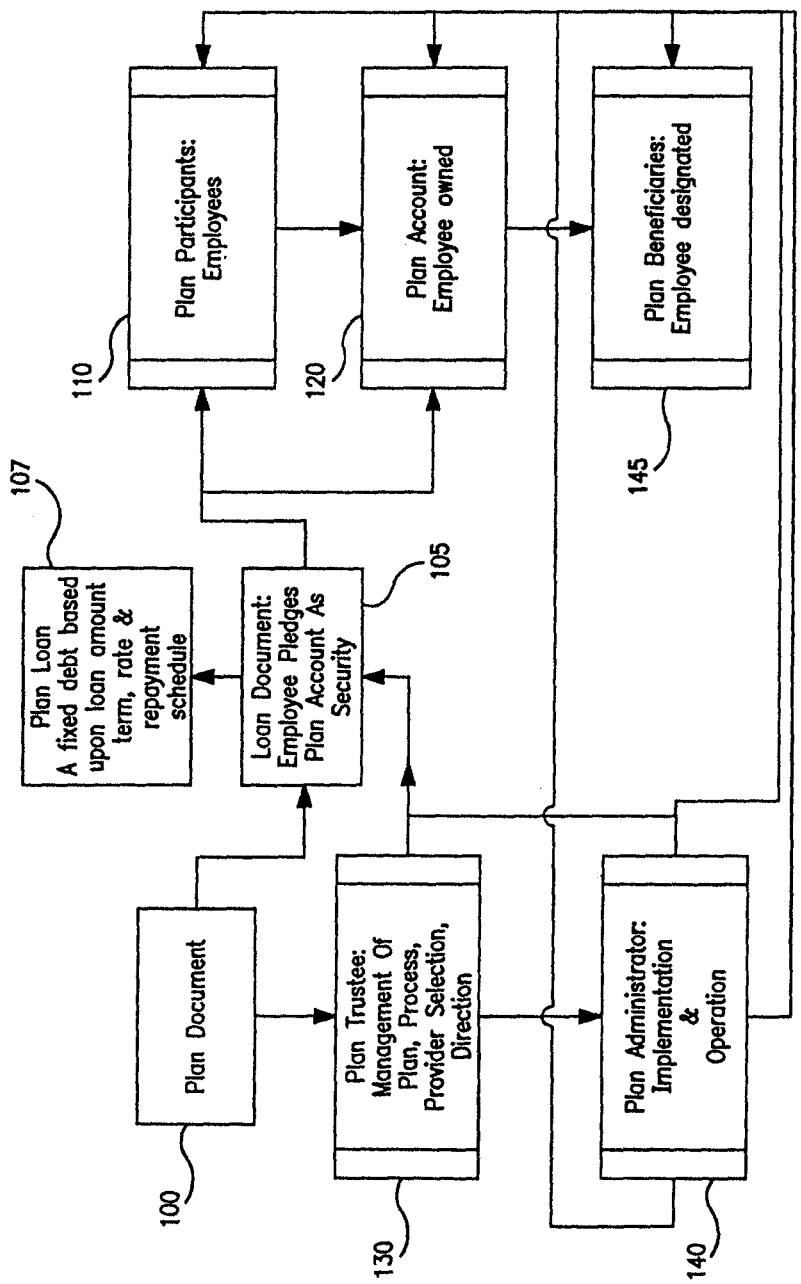
FIG. 2 is a diagram showing the loan framework of a defined contribution pension plan, according to the present invention.

FIG. 2 shows an embodiment of a loan framework within a defined contribution pension, 401(k) plan. Plan document 100 governs the pension insurance plan. It authorizes plan loans and sets forth parameters commensurate with DOL/ERISA & Treasury guidelines. Plan document 100 refers to a loan document 105 in which the employee pledges plan account assets as security. Plan loan 107, in turn, is a fixed debt based upon loan amount, term, rate and repayment schedule. Plan participant 110 borrows, e.g., for up to sixty (60) months, a portion of the plan account balance, not to exceed 50% of the total or $50,000, whichever is less. The plan loan 107 is secured by the remainder of the plan account balance. Plan account 120 is employee-owned.

As further illustrated in FIG. 2, a plan trustee 130 is responsible for the management of the plan, including its processes, the selection of its providers, and the setting of appropriate direction in accordance with plan document 100. Implementation and operation of the plan is carried out by a plan administrator 140, under the control of the plan trustee. The plan administrator 140, based upon the amount of the plan loan and term of repayment requested by the plan participant, calculates a repayment schedule and bills the plan sponsor's payroll system or plan account each pay period until the loan is fully repaid. The plan loan 107 becomes fixed debt reduced by bimonthly repayments, e.g., from the payroll cycle.

Should the plan participant either die or become permanently and totally disabled, however, the remaining balance most often is treated as though it were a distribution from the plan, depleting the remaining balance due the beneficiary. In particular, at the time of occurrence of the risk event, the outstanding loan balance under presently applicable rules is deemed a taxable distribution and, as such, is subject to a 20% withholding and a 10% early withdrawal penalty if the participant is under the age of 59½. Volatile market conditions could therefore reduce plan account values to a level insufficient to pay any taxes that may arise. In some cases, there could be no remaining assets, and yet a simultaneous and significant tax liability. Defaulted loans are reported to the IRS on Form 1099-R. Loans in default are also reported on a separate schedule to the Form 5500. This deficiency in the plan can most often be devastating to the beneficiaries, as the majority of loan applicants and correspondingly their beneficiaries are Non Highly Compensated Employees without significant other assets including life or disability insurance.

Figure 3:
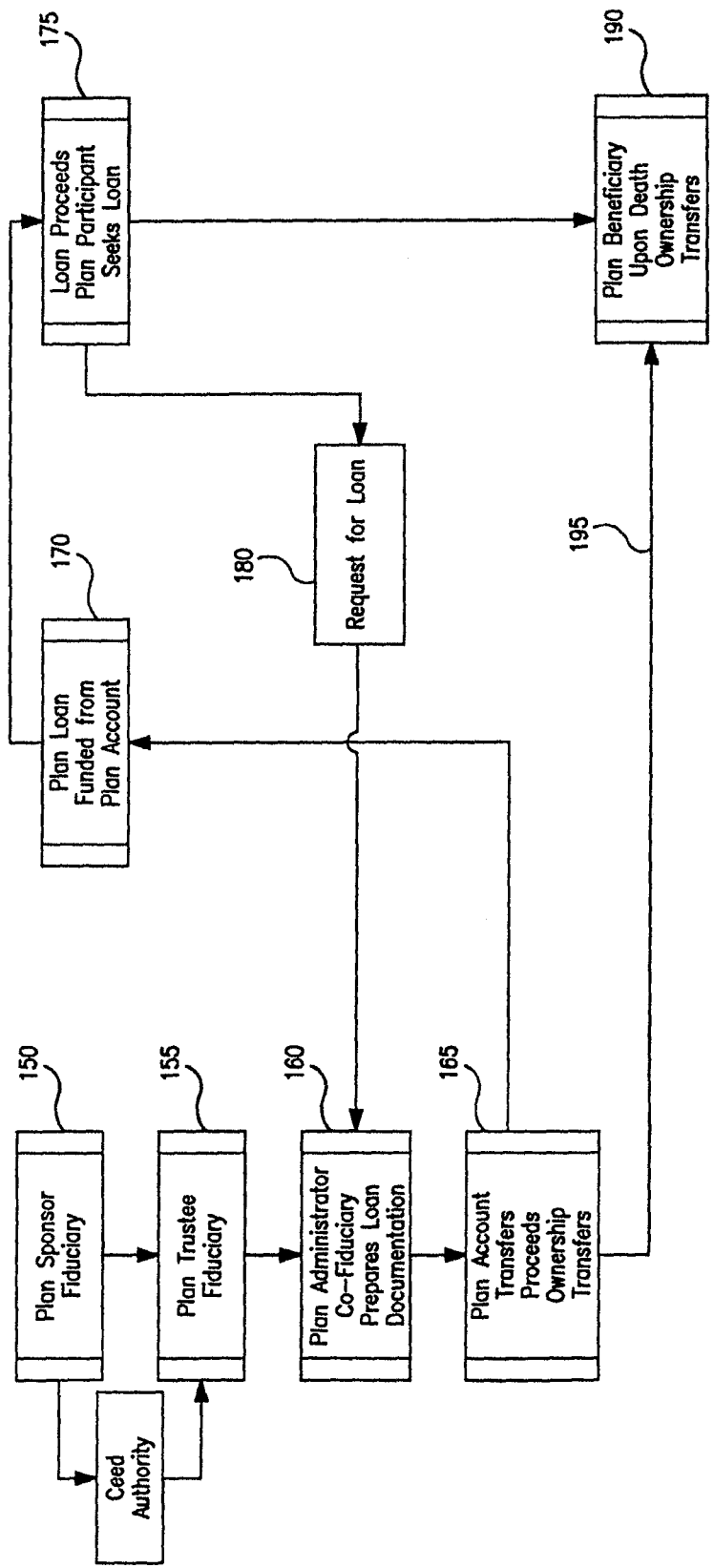
FIG. 3 shows an embodiment of a solution to pension plan deficiencies created by unpaid plan loans upon death or disability of plan participants.

An embodiment of an aspect of the present invention provides a solution to pension plan deficiencies created by unpaid plan loans upon death or disability of plan participants, as shown in FIG. 3. Fiduciaries, plan sponsor 150 and plan trustee 155, cede authorization for plan loan upon death or disability of plan participant to plan trustee fiduciary. Plan administrator co-fiduciary 160 prepares documentation and transfers the value of the plan account 165 to the plan beneficiary 190 directly less any outstanding loan balances. The transfer can occur via any suitable means 195. Plan loan 170 is normally funded from plan account 165. Loan proceeds 175 and request for loan 180 are administered by plan administrator 160. The request or application may take the form of a paper loan disclosure with the terms of the loan, an e-mail computer based application, or a script portion of a voice response unit.

Figure 4A:
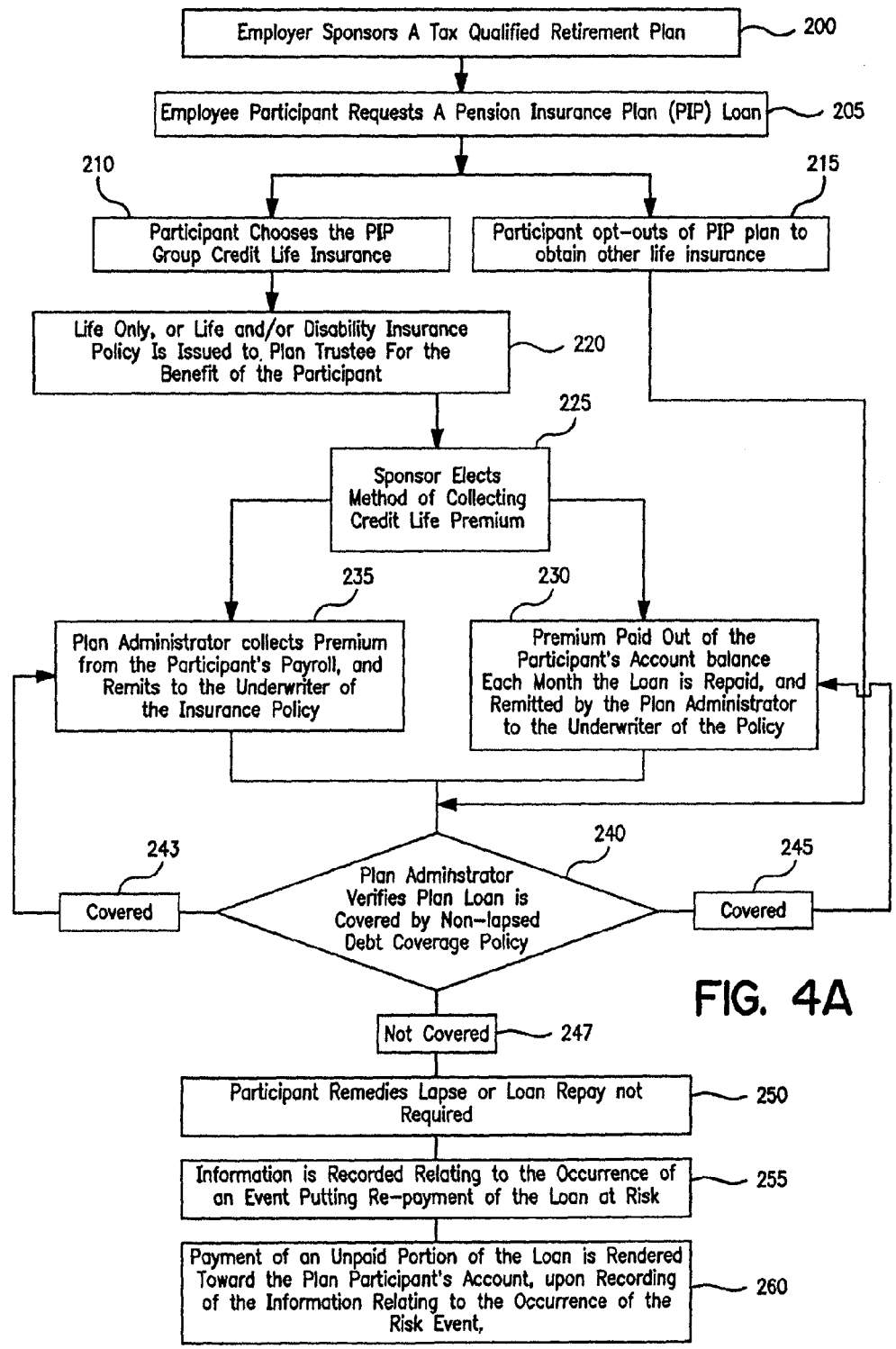
FIG. 4A is another embodiment showing the servicing of a plan loan, according to the present invention.

FIG. 4A shows embodiment of another aspect of the present invention directed to protecting assets in an employee's retirement plan account as provided by his or her employer. A company, as an employer 200, sponsors a tax-qualified retirement plan. The plan permits an employee to request a plan loan 205 in accordance with the provisions of Section 408(b)(1) of the Employee Retirement Income Security Act of 1974, as amended ("ERISA") in an amount not to exceed 50% of the participant's vested account balance. As a condition for the loan, the plan provides that an employee participant who requests a loan shall also be required to provide life insurance to secure the amount of the outstanding loan balance. The plan participant either chooses coverage under the pension insurance plan "program" group (credit) life insurance or life and disability insurance 210 issued to the plan trust, or, optionally, chooses to obtain other life insurance 215 on his or her life in the initial amount of the outstanding loan balance, and in the form of a collateral assignment. An aspect of the pension insurance plan choice involves the issuance to a plan trust of a group credit life insurance policy for the benefit of the plan participant account 220. According to the present invention, the plan trust is the group policyholder and the plan and the applicable plan accounts of the participant-borrowers are the beneficiaries of such policies.

The sponsor elects the method of collecting the credit life premiums 225. In one aspect of the present invention, a pension insurance plan debt coverage policy operates through the payment of the premium for the purchase of the debt coverage policy out of the participant's plan account balance each month as the loan is repaid 230. The debt coverage policy comprises a group insurance policy, or a group credit insurance policy. The credit insurance policy can be a group credit life only insurance policy or a group credit life and/or disability policy. The plan administrator collects the premium at 235 and remits it to the underwriter of the debt coverage policy, less an administrative fee payable to the plan administrator, or for which the trustee would be paid by the pension insurance plan insurance underwriter. It is an aspect of the present invention that the purchase of the debt coverage policy becomes a directed investment in the participant's account. The beneficiary of the debt coverage policy is the trust as the lender of the money (for the benefit of the plan accounts) and the trust allocates the proceeds of the policy, in the event of the participant-borrower's death or disability, to his or her plan account. Such reconstituted plan account balance would be paid directly to the named beneficiary of the plan account.

In another embodiment of the present invention, the plan administrator collects the insurance premium from the participant as part of each installment of the loan repayment from the participant's payroll account 235. The plan administrator remits the premium, which may be less an administrative fee payable to the plan administrator, directly to the underwriter of the group credit life policy. The plan administrator could also be paid the administrative fee directly by the plan insurance underwriter. The beneficiary of the group (credit) life or life and disability policy is the plan trust on behalf of the plan participant's account in the event of the participant's death or disability.

It is an aspect of the present invention that the pension insurance plan program tracks the existence and adequacy of insurance coverage for participants who choose the pension insurance plan debt coverage policy as well as for those who elect to provide separately for their own coverage with another insurer. In particular, it detects the absence of coverage, or unpaid premiums and alerts and notifies the plan administrator of these events or other potential or actual policy lapses. The plan administrator verifies that the plan loan is covered by non-lapsed debt coverage policy, as shown in 240, FIG. 4. Where the plan loan is covered, the plan administrator collects premium through path 243 or 245. If not covered 247, participant remedies lapse or loan repay not required 250. Information is recorded relating to the occurrence of an event putting repayment of the loan at risk 255. Payment of an unpaid portion of the loan is rendered toward the plan participant's account at 260, upon recording of the information relating to the occurrence of the risk event.

Figure 4B:
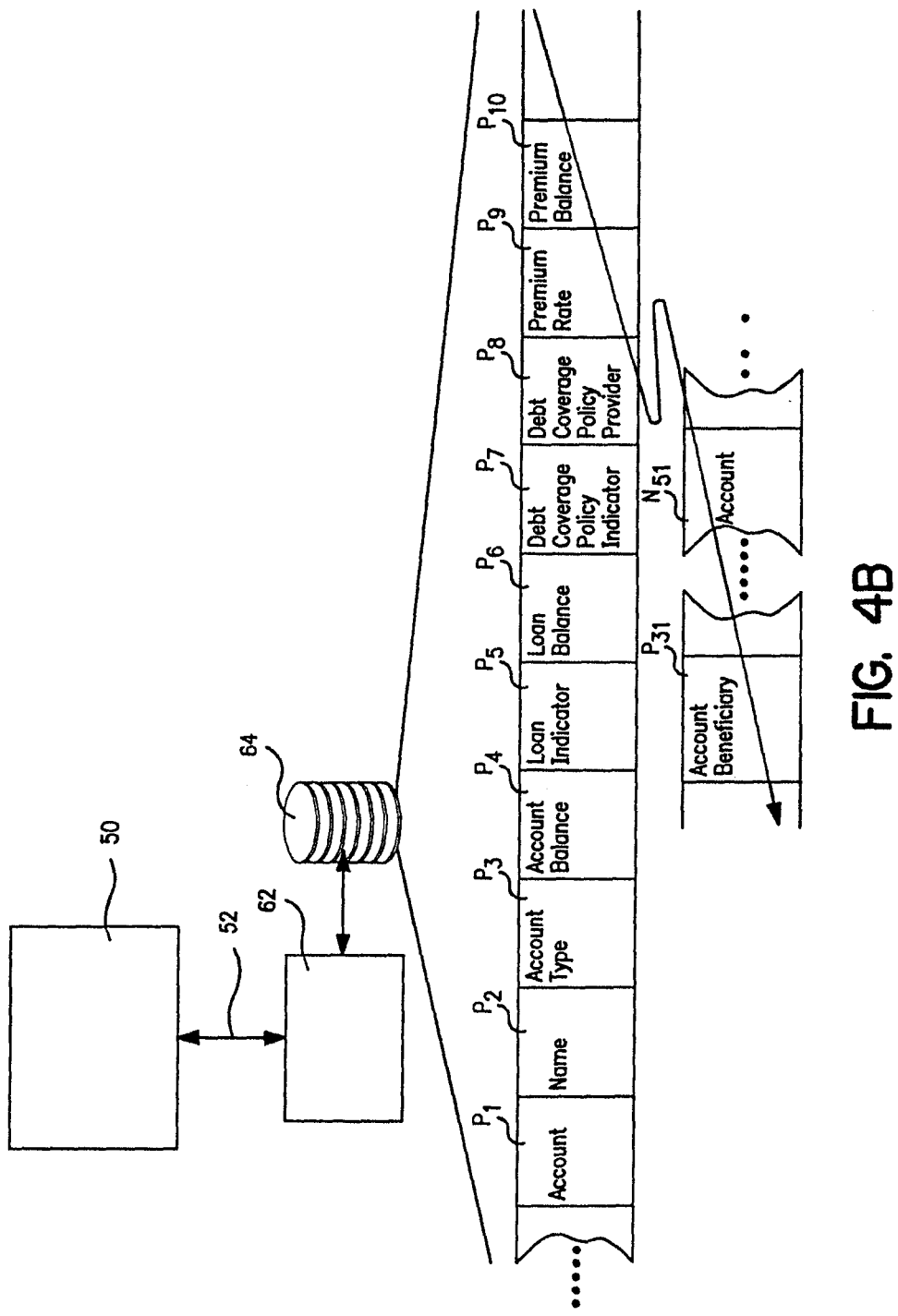
FIG. 4B is a data structure showing an aspect of an embodiment for recording on a computer-readable medium and tracking the valid participation of a plan participant in a defined contribution pension plan, according to the present invention.

In conjunction with the tracking mentioned above, the present invention provides a method for ensuring valid participation of a plan participant in a defined contribution pension plan through the creation of a data structure as shown in FIG. 4B. Plan administrator 240 of FIG. 4A (which also corresponds to 50 of FIG. 1A) is shown in FIG. 4B as having the capability of instructing a computer 62, through suitable communication means 52, to keep records "Pi" of participants' accounts on a computer-readable medium 64. The computer 62 is programmed to write to and read from the computer-readable medium 64. The data structure of the computer-readable medium is configured to keep records involving the account P1, the name P2 of the account holder, the type of account P3 and account balance P4. The type of account P3, for example, indicates whether the premiums are collected through payroll deduction, or through direct debiting from the account balance. Data storage 64 also provides for records involving loan indicator P5, which may be any suitable descriptor of a loan having been taken, as well as loan balance P6. Whether there is adequate debt coverage is also indicated through debt coverage policy indicator P7. Policy coverage provider P6 may comprise that which is offered by the plan sponsor, or by an outside insurer chosen by a participant who has "opted out." The debt coverage policy may comprise life, disability, unemployment or other risk event covering insurance, or any combination thereof. For example, the debt coverage policy may be a group credit life only insurance policy, a group credit life and/or disability policy or debt cancellation coverage. The debt coverage policy indicator is set to a value reflecting selection of the offered policy by the participant. In addition, the data structure 64 may be configured to indicate the premium rate P9 and premium balance P10 of a participant's account P, as well as the account beneficiary P31, for example. The data storage is capable of storing N accounts N51, as shown in FIG. 4B.

Figure 5:
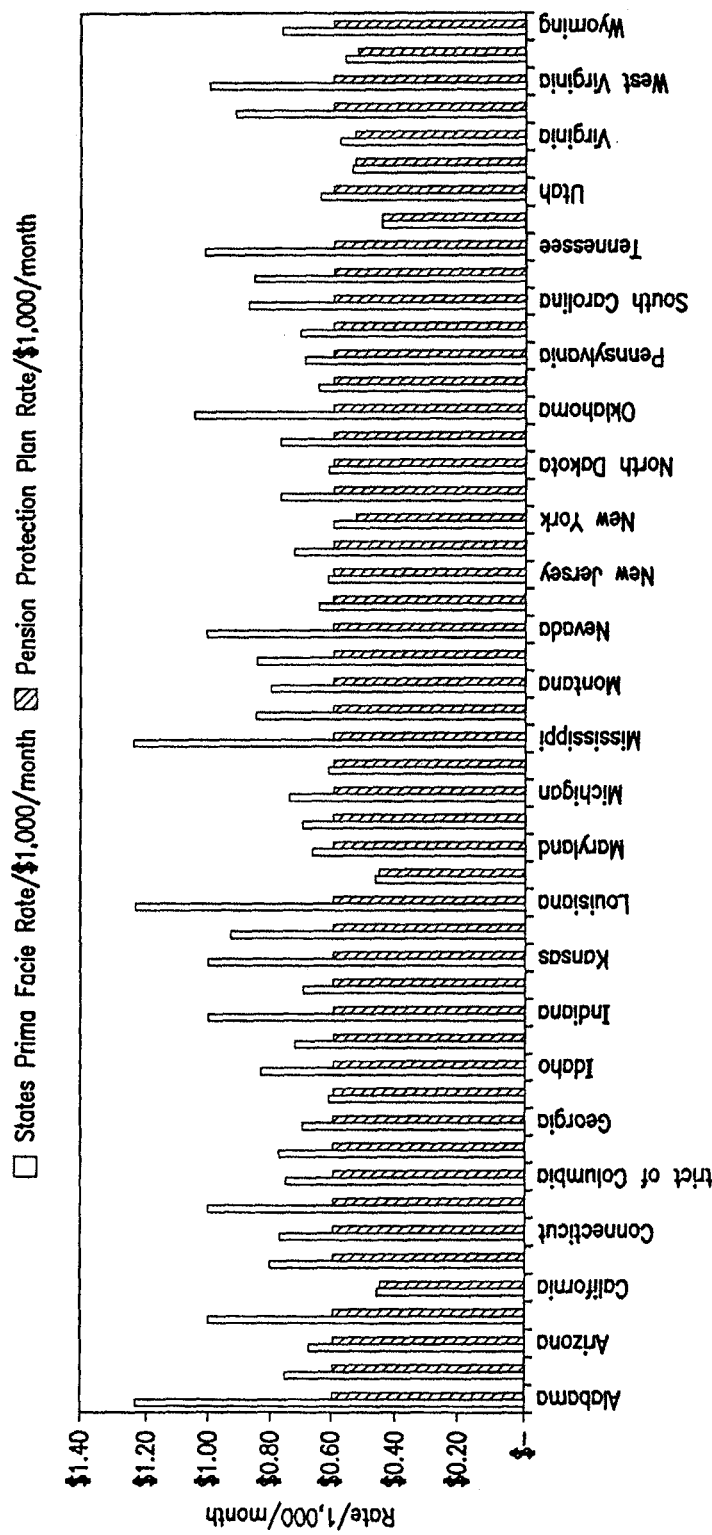
FIG. 5 is a plot of national prima facie rates permitted to be charged with respect to credit life insurance in the United States as of January 2002.

Debt coverage premiums are indexed to national prima facie rates permitted to be charged in each state. FIG. 5 shows a bar plot of prima facie rates for debt coverage in each of the states in the United States in an embodiment of the present invention. Tick marks for all the states are shown on the x-axis. However, some of the state names are skipped so as to make the names legible. In addition, non-state jurisdictions, such as U.S. territories have not been listed but are nevertheless within the scope of the present invention. Prima facie rates along the y-axis, which may be for life, disability, unemployment of other debt coverage, are stated in dollars per month per $1,000 of life insurance coverage. Each state sets a maximum rate permitted to be charged in that state for credit life insurance. In one aspect of an embodiment of the present invention, premium rates are set lower than that corresponding to each respective state, as seen in the cross-hatched bars in FIG. 5. In particular, a single multi-state premium is set at or below the premium rates for a number of states as shown in Table II below. An actual premium is then computed, in one embodiment, by applying the value of the unpaid loan balance. Loan premiums are computed and paid on a monthly, quarterly, or other periodic basis.

In an embodiment of another aspect of the present invention, a multi-state premium is targeted to achieve a 50% loss experience ratio pursuant to which participant-borrower is charged one of three rates, depending upon the maximum rates in effect in the state in which the plan's trust is established. In one embodiment, to the present invention, jurisdictions are distributed into three clusters based upon their rates. A first cluster of jurisdictions comprises the states of California, Maine and Texas, with a plan premium rate of $0.45/month/$1,000. In a second cluster of jurisdictions comprising the states of New York. Virginia, Vermont and Wisconsin, the plan premium rate is $0.53/month/$1,000; while for all other states in the third cluster, the rate is $0.60/month/$1,000. According to an aspect of the present invention, the loan premium rates are lower than the prima facie rates in all jurisdictions except Texas where it is equal to the prima facie rate therein. When, according to the present invention, a premium is set at a known loss ratio below the jurisdiction prima facie, it is expected that sufficiently large numbers of participants with coverage will be widespread, distributing the risk across a broad demographic, while, nevertheless, permitting a reasonable profit to be made by associated service providers.

The rates are also shown in Table I below for both life, and life and disability insurance policies, respectively.

According to the present invention, an embodiment of a debt coverage policy for retirement plan loans, in this case for a life insurance policy, may have a set of parameters shown in Table I:

TABLE I

| | |
|---|---|
| Coverage: | Closed-end loans, single life coverage* |
| Premium Collection Mode: | Monthly outstanding balance method, paralleling the payroll cycle. |
| Life Benefits: | Net coverage, a lump sum payment equal to the amount financed, plus any unpaid interest accrued as of the date of death. |
| Maximum benefit: | $50,000 or amount financed, whichever is less. |
| Maximum term: | 60 months |
| Rate: | $0.60/$1,000/month in all states except: TX, CA & ME where the rate would be $0.45/$1,000/month NY, VA, VT & WI where the rate would be $0.53/$1,000/month. |
| Age limit: | None/parallels pension plan specifics. |
| Suicide: | Excluded pursuant to state regulation (typ. 1 to 2 yrs) |
| Eligible loan class: | 401(k) plan loans (could also include 403(b), IRA, etc.) |
| Underwriting: | Guaranteed issue coverage. |

*A requirement for insurance coverage, as a condition of credit, is permitted by Sec. 226.4 of Regulation Z.

A disability or unemployment debt coverage policy, in accordance with the present invention, will have parameters analogous to those shown in Table I; however, they are likely to have differing prima facie rates. Prima facie rates for disability tend to be significantly higher than for death because of the higher probability that such risk events will occur. Prima facie rates for unemployment insurance have not yet been set, but may be expected and are within the scope of this aspect of the invention.

Figure 6:
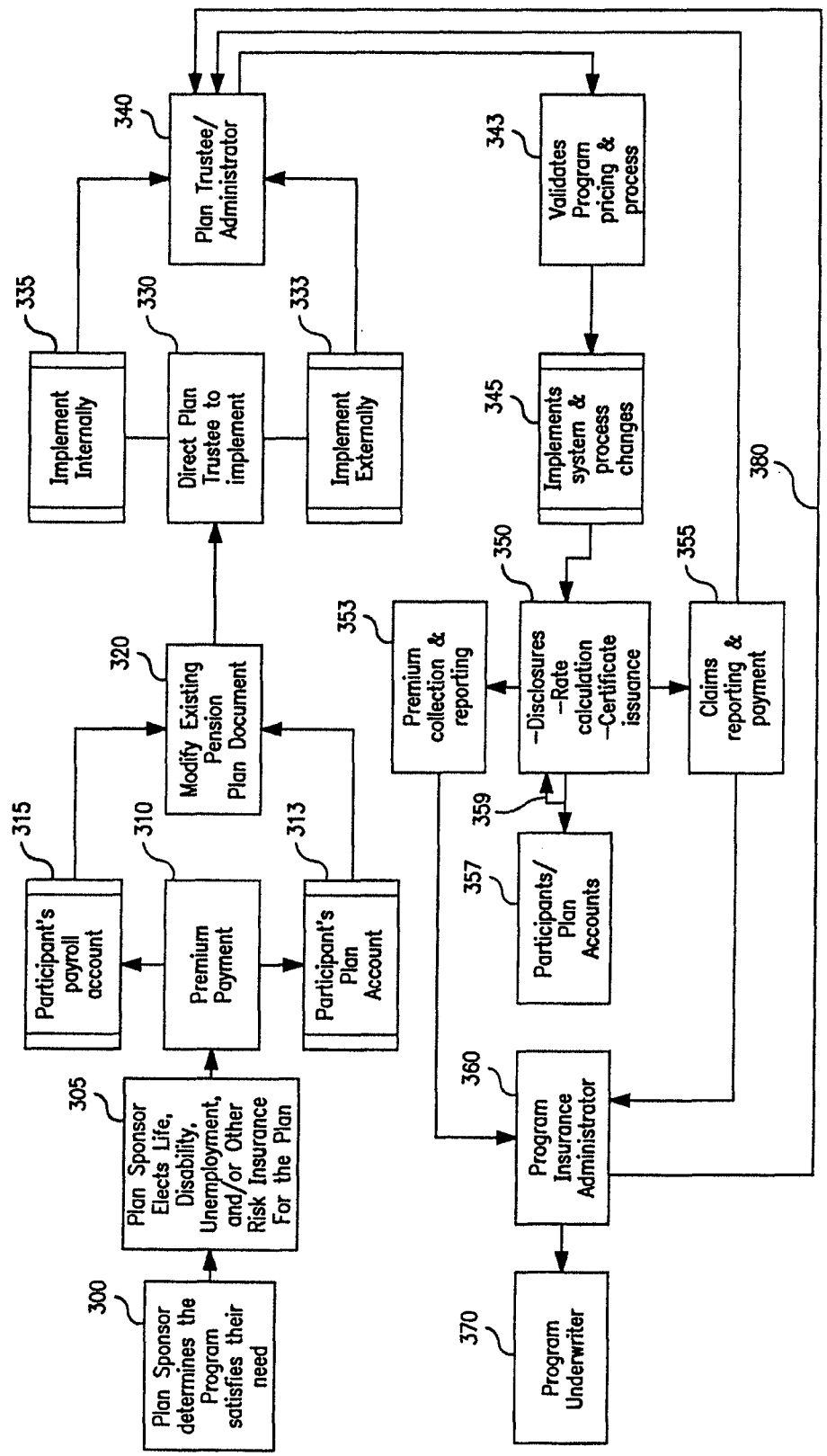
FIG. 6 is a diagram showing an aspect of the process flow of the pension insurance plan program of this invention.

FIG. 6 shows a process flow associated with embodiment of another aspect of the present invention. As described above, a plan sponsor at 300 determines the needs of a pension program and elects 305 the type of pension debt coverage policy to implement. Coverage premium payments are made at 310, either through the participant's payroll account or plan account. Accordingly, the existing pension plan document is modified by the plan sponsor to reflect this choice. Plan trustee is then directed 330 to implement the program either internally 335, or outsourced 333 to an external administrator. Plan trustee and/or administrator at 340 validates program pricing and process 343 through the independent fiduciary, and at 345 implements system and process changes as necessary within the loan administration system. The plan administrator and/or trustee introduces the insurance options into the plan loan disclosures, including rate calculations and disclosures for plan participants. It then either issues certificates, if participants choose coverage under the pension insurance plan debt coverage policy issued to the plan trust, or gathers pertinent policy data, should participants elect to arrange for insurance coverage themselves. The plan administrator and/or trustee also, at 350, performs premium collection and reporting 353, claims reporting and payment 355, to pension insurance plan program insurance administrator 360. The choice reflected by the participants then flows back at 359 for storage in a database, recording which insurance type is established. Either a) they accept pension insurance plan debt coverage policy and they are billed from the appropriate account for the pension insurance plan coverage or b) they choose to "opt-out" arranging for their own coverage and reporting same to the plan trust, necessitating a gathering of pertinent data for the opt-out tracking database and the billing for such service. Plan administrator 340 then remits premiums to insurance administrator 360 on behalf of underwriter 370, with or without withholding administrative fees. Otherwise the program underwriter can pay the fees directly to the plan administrator. Plan administrator 360 may receive a fee for their insurance processing. The fee may be deducted from premiums prior to remittance or it may be paid from the plan program insurance administrator on behalf of the underwriter. The process decision on administrator payment may be made as the program is installed.

According to another aspect of the present invention, as shown in the embodiment of FIG. 6, claims payment process 355 begins with a reported death, disability, unemployment or other risk event from plan sponsor 300 to plan administrator 340. The process then proceeds through at 360, to a program insurance administrator via claim form and creditor statement from the plan trust, indicating the amount of the balance outstanding at the time of claim. Claims payments follow the reverse route to the plan trustee/administrator at 340, which causes payments to be made to the participant's plan account (not shown).

In another aspect of the present invention, once the plan sponsor has established a program to provide an insurance benefit to the plan participants that permits taking loans secured by plan account assets, the plan document is modified to include the requirement for insurance and the plan trustee/administrator requests an application for a pension debt coverage policy from the pension insurance plan program insurance administrator via path 380, and a group master policy is issued to the plan trust for the benefit of its plan participants, as shown in FIG. 6.

Figure 7:
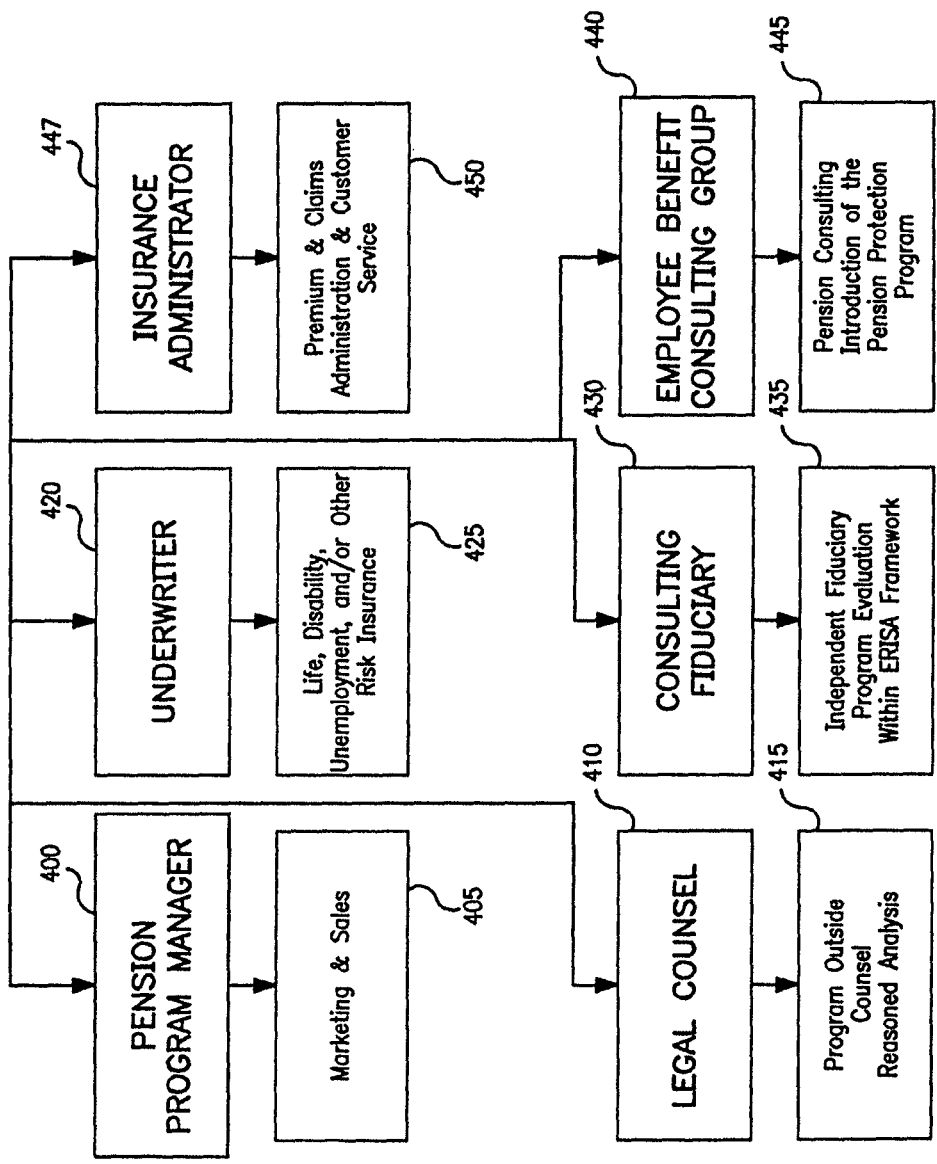
FIG. 7 shows the participating partners in the pension insurance plan program, according to the present invention.

FIG. 7 shows an embodiment of an arrangement in accordance with the present invention for establishing and implementing a pension insurance plan program involving partners comprising a pension program manager 400, legal counsel 410, underwriter 420, consulting fiduciary 430, insurance administrator 447 and employee benefit consulting group 440. A service corporation, acting as pension program manager 400, develops and markets a pension insurance plan program with over-all management responsibility, including marketing and sales 405. Underwriter 420 provides a debt coverage policy 425, as described above. The insurance administrator administers the premium collection, claim disbursements 450 and manages customer service. The legal counsel 410 provides reasoned analysis, drafts plan amendments, loan disclosures, DOL "requests for ruling", and provides follow-up assistance as required 415. A consulting fiduciary, e.g., as an independent consulting firm, 430 provides program evaluation on behalf of a plan sponsor-fiduciary (such as employer 30 in FIG. 1A) to validate that the premium charged to plan participants for the group credit insurance coverage is reasonable compared to other insurance coverage of similar underwriting and benefit structure, and that the fees paid to plan administrators by the underwriter 420 for their administrative costs to implement the pension insurance plan program are reasonable under the ERISA framework 435. The employee benefit consulting group 440 handles referrals from within the insurance brokerage firm and from the pension insurance plan program manager and manages those referrals through to the introduction of the pension insurance plan to prospective plan sponsors concluding in the sale and installation of the pension insurance plan program.

Figure 8:
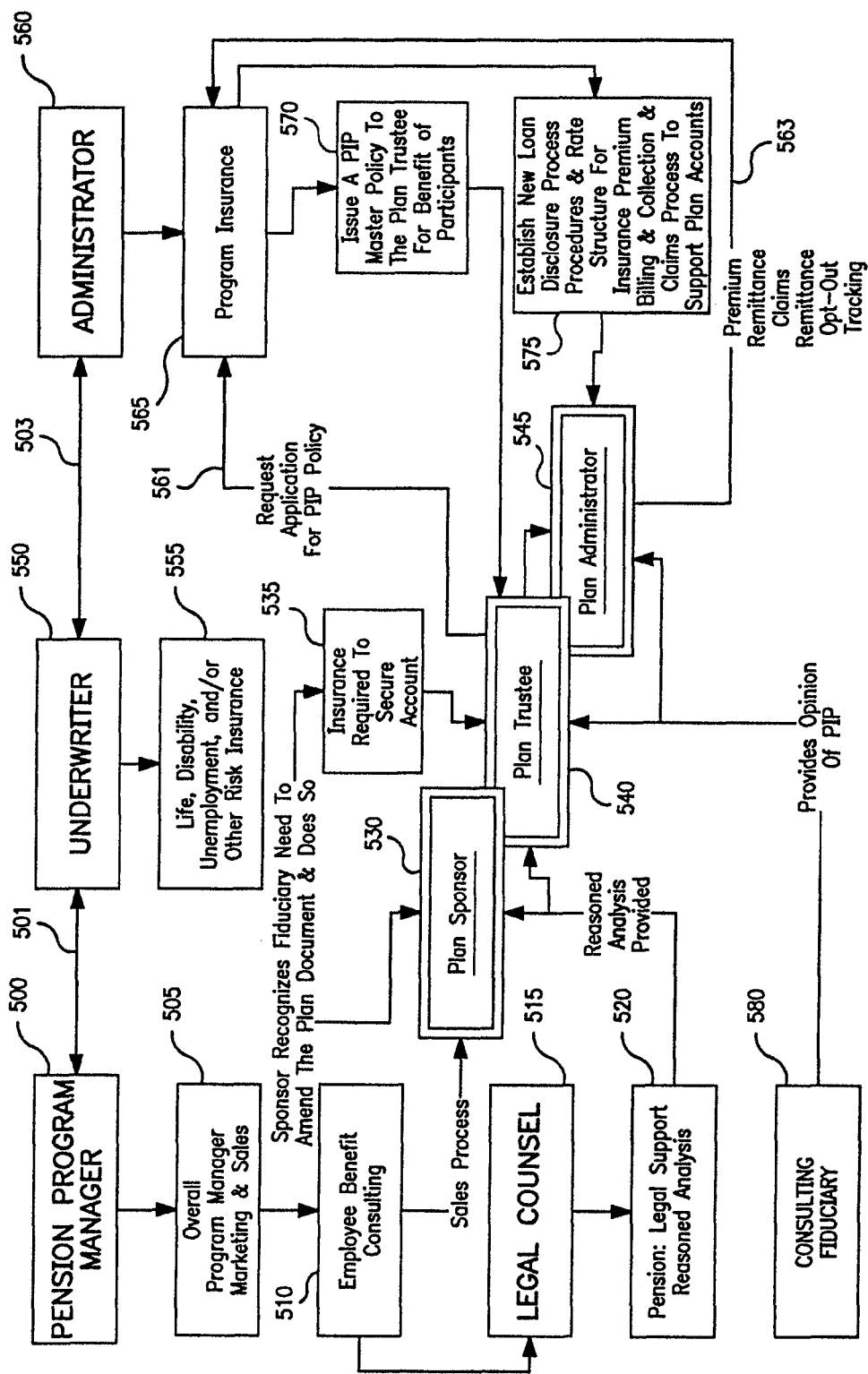
FIG. 8 shows how the partners and the pension insurance plan program interact in carrying out the various processes of the present invention.

FIG. 8 shows an embodiment of a process by which the responsible partners implement the pension insurance plan program. Pension program manager 500, the overall program manager 505 for marketing and sales interacts over path 501, which may be any suitable communication means, with underwriter 550. Insurance underwriter 550 and insurance administrator 560 interact through paths 501 and 503, while insurance administrator 560 interacts with plan trustee 540 and plan administrator directly 545 through paths 561 and 563, respectively. The insurance underwriter 550 writes life, disability, unemployment and other risk related policies, or combinations 555 thereof, as required to secure the retirement account 535. The insurance administrator 560 administers program insurance 565 that is issued under the auspices of the pension insurance plan master policy 570. The insurance administrator 560 establishes for the program insurance 565, loan disclosure procedures, rate structures, premium billing and collection methods, claims processing procedures 575. Plan sponsor 530 can amend the plan document to obtain the pension insurance plan program required to secure the retirement accounts, and can delegate the operations to the plan trustee 540. Plan sponsor 530 has the benefit of employee benefit consulting 510 and legal support 520 in the form of a reasoned analysis performed by a legal counsel 515 that is also provided to the plan trustee, and an opinion about the pension plan directly from an independent consulting firm acting as an independent fiduciary 580. Plan sponsor 530 receives input from employee benefit consulting 510, but only plan trustee receives opinion regarding the pension insurance plan from consulting fiduciary 580. Insurance administrator 560/565 issues 570 debt coverage insurance policy to plan trustee 540. Insurance administrator 560/565 establishes suitable administrative procedures 575 and submits to plan administrator 545.

While the invention has been particularly shown and described with reference to particular embodiments, those skilled in the art will understand that various changes in form and details may be made without departing form the spirit and scope of the invention.

What is claimed is:

1. A computer-implemented method for administering a loan from assets in a retirement account, the method comprising:
    calculating, using a computer, a coverage against a risk event during repayment of a loan taken from a retirement plan account of a participant,
        wherein the coverage is based upon a balance of the loan and the remaining assets in the retirement plan account;
    establishing, using a computer, a database that stores a record for the participant and the coverage for the participant;
    receiving notification, utilizing a computer, of occurrence of a risk event subjecting the loan to potential non-payment default and triggering payment of a benefit under the coverage;
    upon receipt of the notification, causing, utilizing a computer, a claim to be presented to a coverage provider;
    receiving, from the coverage provider, value equal to the balance of the loan in response to the claim; and
    updating a record in a database to reflect the received value.

2. The method according to claim 1, wherein the record further comprises terms of the loan.

3. The method according to claim 1, wherein the risk event is death, disability, or unemployment of the participant.

4. The method according to claim 1, wherein the risk event prevents the participant from making a payment towards the balance of the loan.

5. The method according to claim 1, wherein a balance of the retirement account passes to a beneficiary in the occurrence of the risk event.

6. A computer-implemented method for administering a loan from assets in a retirement account, the method comprising:
    establishing, utilizing a computer, a debt mitigation coverage to protect assets in a retirement account of a participant from loan default,
        wherein the pension debt mitigation coverage protects an unpaid balance of the loan upon an occurrence of a risk event;
    establishing, utilizing a computer, a database that stores a record for the participant and the debt mitigation coverage for the participant;
    receiving notification, utilizing a computer, of occurrence of a risk event subjecting the loan to potential non-payment default and triggering payment of a benefit under the debt mitigation coverage;
    upon receipt of the notification, causing, utilizing a computer, a claim to be presented to a provider of the debt mitigation coverage;
    receiving, from the provider, value equal to the balance of the loan in response to the claim; and
    updating a record in a database to reflect the received value.

7. The method according to claim 6, wherein the assets of the retirement account serve as collateral for a loan to the insured participant.

8. The method according to claim 6, further comprising enrolling, using a computer, the participant in the debt mitigation coverage unless the participant opts-out of the enrollment.

9. A computer-implemented method for administering a claim, the method comprising:
    establishing, using a computer, a debt mitigation strategy for a balance of a loan to a participant from assets accumulated in a retirement account of the participant,
        wherein the loan is collateralized by the assets accumulated in the retirement account;
    tracking, using the computer, the status of the debt mitigation strategy;
    receiving, using the computer, information relating to an occurrence of an event subjecting the loan to potential non-payment default; and
    presenting, using the computer, a claim for the balance of the loan.

10. The method according to claim 9, further comprising notifying, utilizing the computer, a plan administrator upon the lapse of the debt mitigation strategy.

11. The method according to claim 9, further comprising receiving, utilizing the computer, a value equal to the balance of the loan.

12. The method according to claim 11, further comprising updating, utilizing the computer, a record of the participant to reflect the received value.

13. The method according to claim 9, wherein tracking the status of the debt mitigation strategy further comprises determining whether the participant is participating in the debt mitigation strategy.

14. The method according to claim 13, further comprising determining, using the computer, whether the participant elected to separately obtain coverage from an insurer.

15. The method according to claim 13, further comprising detecting, using the computer, an absence of coverage for the participant.

16. The method according to claim 15, further comprising alerting, using the computer, a plan administrator about the absence of coverage for the participant.

17. The method according to claim 9, wherein tracking the status of the debt mitigation strategy further comprises determining, using the computer, the adequacy of debt mitigation strategy.

18. The method according to claim 9, further comprising receiving, using the computer, a validation of the event subjecting the loan to potential non-payment default.

19. The method according to claim 9, further comprising electronically remitting payment of the claim to a plan account.

20. The method according to claim 19, further comprising applying, using the computer, the payment of the claim to the balance of the loan.

21. The method according to claim 9, wherein the event is death or disability of the participant.

22. A computer-implemented method for adjudicating a claim for a payment to a retirement plan, the method comprising:
- establishing, utilizing a computer, a record for a participant participating in the retirement plan;
- receiving, utilizing the computer, a request for the participant to take a loan from an investment vehicle of the retirement plan;
- establishing, utilizing the computer, a debt mitigation strategy providing coverage for a balance of the loan in the occurrence of a risk event subjecting the loan to potential default;
- tracking, utilizing the computer, the existence of the debt mitigation strategy;
- tracking, utilizing the computer, the adequacy of the debt mitigation strategy;
- receiving, utilizing the computer, a notification of the occurrence of the risk event subjecting the loan to potential default;
- presenting, utilizing the computer, a claim for payment of the balance of the loan; and
- receiving, utilizing the computer, a payment to apply to the balance of the loan.

23. The method according to claim 22, wherein the loan is collateralized by funds in the investment vehicle.

24. The method according to claim 22, further comprising calculating, utilizing the computer, a premium for coverage of the participant by the debt mitigation strategy.

25. The method according to claim 22, further comprising notifying, using the computer, a plan administrator upon the lapse of the debt mitigation strategy.

26. The method according to claim 22, wherein the payment is equal to the balance of the loan.

27. The method according to claim 22, further comprising determining, using the computer, whether the participant elected to separately obtain coverage from an insurer.

28. The method according to claim 22, further comprising receiving, using the computer, a validation of the event subjecting the loan to potential non-payment default.

29. The method according to claim 22, wherein the risk event is death or disability of the participant.

30. A program on a non-transient computer-readable medium of a computer, the program configured to execute a method comprising:
- calculating, using a computer, a coverage against a risk event during repayment of a loan taken from a retirement plan account of a participant,
  - wherein the coverage is based upon a balance of the loan and the remaining assets in the retirement plan account;
- establishing, using a computer, a database that stores a record for the participant and the coverage for the participant;
- receiving notification, utilizing a computer, of occurrence of a risk event subjecting the loan to potential non-payment default and triggering payment of a benefit under the coverage;
- upon receipt of the notification, causing, utilizing a computer, a claim to be presented to a coverage provider;
- receiving, from the coverage provider, value equal to the balance of the loan in response to the claim; and
- updating a record in a database to reflect the received value.

31. The program according to claim 30, wherein the record further comprises terms of the loan.

32. The program according to claim 30, wherein the risk event is death, disability, or unemployment of the participant.

33. The program according to claim 30, wherein the risk event prevents the participant from making a payment towards the balance of the loan.

34. A system for administering a loan from assets in a retirement account, the system comprising:
- a computer configured to:
  - calculate a coverage against a risk event during repayment of a loan taken from a retirement plan account of a participant,
    - wherein the coverage is based upon a balance of the loan and the remaining assets in the retirement plan account;
  - receive notification of occurrence of a risk event subjecting the loan to potential non-payment default and trigger payment of a benefit under the coverage;
  - cause a claim to be presented to a coverage provider; and
  - receive a value equal to the balance of the loan in response to the claim; and
- a database communicatively coupled to the computer, the database configured to:
  - store a record for the participant and the coverage for the participant; and
  - update the record to reflect the received value.

35. The system according to claim 34, wherein the record further comprises terms of the loan.

36. The system according to claim 34, wherein the risk event is death, disability, or unemployment of the participant.

37. The system according to claim 34, wherein the risk event prevents the participant from making a payment towards the balance of the loan.

38. A program on a non-transient computer-readable medium of a computer, the program configured to execute a method comprising:
- establishing, utilizing a computer, a debt mitigation coverage to protect assets in a retirement account of a participant from loan default,
  - wherein the pension debt mitigation coverage protects an unpaid balance of the loan upon an occurrence of a risk event;
- establishing, utilizing a computer, a database that stores a record for the participant and the debt mitigation coverage for the participant;
- receiving notification, utilizing a computer, of occurrence of a risk event subjecting the loan to potential non-payment default and triggering payment of a benefit under the debt mitigation coverage;
- upon receipt of the notification, causing, utilizing a computer, a claim to be presented to a provider of the debt mitigation coverage;
- receiving, from the provider, value equal to the balance of the loan in response to the claim; and
- updating a record in a database to reflect the received value.

39. The program according to claim 38, wherein the assets of the retirement account serve as collateral for a loan to the insured participant.

40. A system for administering a loan from assets in a retirement account, the system comprising:
   a computer configured to:
      establish a debt mitigation coverage to protect assets in a retirement account of a participant from loan default,
         wherein the pension debt mitigation coverage protects an unpaid balance of the loan upon an occurrence of a risk event;
      receive a notification of an occurrence of a risk event subjecting the loan to potential non-payment default and trigger payment of a benefit under the debt mitigation coverage;
      upon receipt of the notification, cause a claim to be presented to a provider of the debt mitigation coverage; and
      receive a value equal to the balance of the loan in response to the claim; and
   a database configured to:
      store a record for the participant and the debt mitigation coverage for the participant; and
      update the record in a database to reflect the received value.

41. The system according to claim 40, wherein the assets of the retirement account serve as collateral for a loan to the insured participant.

42. A program on a non-transient computer-readable medium of a computer, the program configured to execute a method comprising:
   establishing, using a computer, a debt mitigation strategy for a balance of a loan to a participant from assets accumulated in a retirement account of the participant,
      wherein the loan is collateralized by the assets accumulated in the retirement account;
   tracking, using the computer, the status of the debt mitigation strategy;
   receiving, using the computer, information relating to an occurrence of an event subjecting the loan to potential non-payment default; and
   presenting, using the computer, a claim for the balance of the loan.

43. The program according to claim 42, wherein the event is death, disability, or unemployment of the participant.

44. The program according to claim 42, wherein the event prevents the participant from making a payment towards the balance of the loan.

45. A system for administering a loan from assets in a retirement account, the system comprising:
   a computer configured to:
      establish a debt mitigation strategy for a balance of a loan to a participant from assets accumulated in a retirement account of the participant,
         wherein the loan is collateralized by the assets accumulated in the retirement account;
      track the status of the debt mitigation strategy;
      receive information relating to an occurrence of an event subjecting the loan to potential non-payment default; and
      present a claim for the balance of the loan.

46. The system according to claim 45, wherein the risk event is death, disability, or unemployment of the participant.

47. The system according to claim 45, wherein the risk event prevents the participant from making a payment towards the balance of the loan.

48. A program on a non-transient computer-readable medium of a computer, the program configured to execute a method comprising:
   establishing, utilizing a computer, a record for a participant participating in the retirement plan;
   receiving, utilizing the computer, a request for the participant to take a loan from an investment vehicle of the retirement plan;
   establishing, utilizing the computer, a debt mitigation strategy providing coverage for a balance of the loan in the occurrence of a risk event subjecting the loan to potential default;
   tracking, utilizing the computer, the existence of the debt mitigation strategy;
   tracking, utilizing the computer, the adequacy of the debt mitigation strategy;
   receiving, utilizing the computer, a notification of the occurrence of the risk event subjecting the loan to potential default;
   presenting, utilizing the computer, a claim for payment of the balance of the loan; and
   receiving, utilizing the computer, a payment to apply to the balance of the loan.

49. The program according to claim 48, wherein the loan is collateralized by funds in the investment vehicle.

50. The program according to claim 48, wherein the payment is equal to the balance of the loan.

51. The program according to claim 48, wherein the risk event is death or disability of the participant.

52. A system for administering a loan from assets in a retirement account, the system comprising:
   a computer configured to:
      establish a record for a participant participating in the retirement plan;
      receive a request for the participant to take a loan from an investment vehicle of the retirement plan;
      establish a debt mitigation strategy providing coverage for a balance of the loan in the occurrence of a risk event subjecting the loan to potential default;
      track the existence of the debt mitigation strategy;
      track the adequacy of the debt mitigation strategy;
      receive a notification of the occurrence of the risk event subjecting the loan to potential default;
      present a claim for payment of the balance of the loan; and
      receive a payment to apply to the balance of the loan.

53. The system according to claim 52, wherein the loan is collateralized by funds in the investment vehicle.

54. The system according to claim 52, wherein the payment is equal to the balance of the loan.

55. The system according to claim 52, wherein the risk event is death or disability of the participant.

* * * * *